United States Patent
Schaefer

(10) Patent No.: US 7,498,372 B2
(45) Date of Patent: Mar. 3, 2009

(54) ETHER-ESTER PLASTICIZERS

(75) Inventor: George F. Schaefer, Strongsville, OH (US)

(73) Assignee: Ferro Corporation, Cleveland, OH (US)

( * ) Notice: Subject to any disclaimer, the term of this patent is extended or adjusted under 35 U.S.C. 154(b) by 641 days.

(21) Appl. No.: 11/164,558

(22) Filed: Nov. 29, 2005

(65) Prior Publication Data

US 2007/0123622 A1   May 31, 2007

(51) Int. Cl.
*C08K 5/103* (2006.01)

(52) U.S. Cl. .................. 524/308; 524/311
(58) Field of Classification Search .......... 524/308, 524/311
See application file for complete search history.

(56) References Cited

U.S. PATENT DOCUMENTS

| | | | | |
|---|---|---|---|---|
| 2,604,489 A | * | 7/1952 | Melstrom et al. | 560/254 |
| 3,072,591 A | * | 1/1963 | Fath | 524/293 |
| 3,186,961 A | * | 6/1965 | Sears | 524/114 |
| 5,739,203 A | * | 4/1998 | Ngoc | 524/527 |
| 6,784,249 B2 | * | 8/2004 | Ngoc | 525/191 |

FOREIGN PATENT DOCUMENTS

WO   99/59947 A1   11/1999

OTHER PUBLICATIONS

Results of search conducted using the CAS SciFinder database on May 2, 2006.

* cited by examiner

*Primary Examiner*—Tae H Yoon
(74) *Attorney, Agent, or Firm*—Rankin, Hill & Clark LLP

(57) ABSTRACT

The present invention provides compounds having both a pendent ether group and a pendent ester group that are useful as plasticizers for polymer resin and methods of making and using the same. In one embodiment of the invention, compounds according to the invention are formed by converting at least one, but not all, of the hydroxyl groups of a polyol having three or more hydroxyl groups (e.g., gylcerol, pentaerythritol or dipentaerythritol) to a pendent ether group to form a partially-etherized intermediate, and then converting at least one of the remaining hydroxyl groups in the partially-etherized intermediate to a pendent ester group.

9 Claims, No Drawings

ETHER-ESTER PLASTICIZERS

BACKGROUND OF THE INVENTION

1. Field of Invention

The present invention provides compounds including both a pendent ether group and a pendent ester group that are particularly useful as plasticizers for polymer resins, a method of making the same and polymer resins plasticized with such compounds.

2. Description of Related Art

Plasticizers are compounds or mixtures of compounds that are added to polymer resins to impart softness and flexibility. O-phthalic acid diesters, which are more commonly referred to as "phthalates", are the primary plasticizers for most flexible polymer products, especially polymer products formed from polyvinyl chloride (PVC) and other vinyl polymers. Examples of common phthalate plasticizers include, for example, di-isononyl phthalate (DINP), diallyl phthalate (DAP), and di-2-ethylhexyl-phthalate (DEHP).

Phthalate plasticizers have been tested for more than 40 years and are among the most studied and best understood compounds in the world from a health and environmental perspective. Nevertheless, there is a demand for phthalate-free plasticizers that provide the same or better properties when added to polymer resins such as, for example, vinyl polymers, rubbers, polyurethanes, and acrylics.

BRIEF SUMMARY OF THE INVENTION

The present invention provides phthalate-free compounds having both a pendent ether group and a pendent ester group that are particularly useful as plasticizers for polymer resins, a method of making the same and polymer resins plasticized with such compounds. Ether-ester plasticizer compounds according to the invention can be formed by: (A1) converting at least one, but not all, of the hydroxyl groups of a polyol having three or more hydroxyl groups to a pendent ether group to form a partially-etherized intermediate; and (A2) converting at least one of the remaining hydroxyl groups in the partially-etherized intermediate to a pendent ester group. Alternatively, ether-ester plasticizer compounds according to the invention can be formed by: (B1) converting at least one, but not all, of the hydroxyl groups of a polyol having three or more hydroxyl groups to a pendent ester group to form a partially-esterified intermediate; and (B2) converting at least one of the remaining hydroxyl groups in the partially-esterified intermediate to a pendent ether group. Typically, a mixture of different ether-ester plastercizer compounds is formed in accordance with these methods. The individual ether-ester plasticizer compounds in the mixture can be isolated and used individually as plasticizer compounds or, more preferably, the mixture of different ether-ester compounds can be used as a plasticizer composition.

The ether-ester plasticizer compounds according to the invention are very compatible with a wide variety of polymers including vinyl polymers, rubbers, polyurethanes, and acrylics. In addition, the ether-ester plasticizer compounds according to the invention have superb thermostability and low volatility. If desired, the ether-ester plasticizer compounds according to the invention can be used in combination with conventional plasticizer compounds.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Ether-ester compounds according to the present invention are phthalate-free. Throughout the instant specification and in the appended claims, the term "phthalate-free" means that the compounds are not derived from phthalic acid or phthalic anhydride and do not contain any phthalic acid derivatives. Compounds according to the present invention comprise at least one pendent ether group according to the formula I:

and at least one pendent ester group according to the formula II:

where X represents a carbon atom in a linear or branched chain saturated organic compound, $R_1$ represents an alkyl or an aryl group, $R_2$ represents an alkyl or an aryl group, and $R_1$ and $R_2$ are the same or different, and the sum of all pendent ether groups according to formula I and all pendent ester groups according to formula II in the compound is equal to or greater than 3. Throughout the instant specification and in the claims, the term "pendent" means that the ether groups and the ester groups extend from or hang from a chain carbon atom and terminate in the $R_1$ or $R_2$ group.

Ether-ester plasticizer compounds according to the invention are preferably formed by: (A1) converting at least one, but not all, of the hydroxyl groups of a polyol having three or more hydroxyl groups to a pendent ether group to form a partially-etherized intermediate, and then (A2) converting at least one of the remaining hydroxyl groups in the partially-etherized intermediate to a pendent ester group; or (B1) converting at least one, but not all, of the hydroxyl groups of a polyol having three or more hydroxyl groups to a pendent ester group to form a partially-esterified intermediate, and then (B2) converting at least one of the remaining hydroxyl groups in the partially-esterified intermediate to a pendent ether group.

It will be appreciated that there are many different mechanisms by which a hydroxyl group of a polyol can be converted to a pendent ether group. The most preferred mechanism for converting a hydroxyl group of a polyol to a pendent ether group is known as the Williamson ether synthesis, which involves forming an alkoxide salt by reacting the hydroxyl group (i.e., an alcohol group) with an active metal such as metallic sodium or a metal hydride such as NaH or a metal hydroxide to form an alkoxide salt, and then reacting the alkoxide salt with an alkyl halide or an alkyl sulfate to produce a pendent ether group.

Similarly, there are many different mechanisms by which a hydroxyl group of a polyol can be converted to a pendent ester group. However, the preferred mechanism for use in the invention is widely known as Fischer esterification, in which a carboxylic acid reacts with a hydroxyl group under acidic conditions to produce a pendent ester group.

When the Williamson ether synthesis is performed as the first step in the method of the invention, less than n moles of an alkyl halide or an alkyl sulfate and less than n moles of active metal must be used per mole of polyol having n hydroxyl groups. Use of n or greater moles of an alkyl or aryl halide and an active metal could result in every available hydroxyl group on the polyol being converted to a pendent ether group, which would leave no hydroxyl groups available for subsequent Fischer esterification. It will be appreciated that although less than n moles of an alkyl halide or an alkyl sulfate and less than n moles of an active metal are used per mole of polyol having n hydroxyl groups, a relatively small percentage of the polyol molecules in the reaction batch may have all of their hydroxyl groups converted to pendent ether groups or may not have any of their hydroxyl groups converted to pendent ether groups, but the majority of the polyol molecules in the intermediate reaction batch will be partially-etherized, with at least one hydroxyl group still remaining. The intermediate reaction batch containing the partially-etherized compound(s) can then be subjected to Fischer esterification to produce a final reaction batch comprising a large percentage of ether-ester compounds according to the invention.

Likewise, when Fischer esterification is performed as the first step in the method of the invention, less than n moles of a carboxylic acid must be used per mole of polyol having n hydroxyl groups. Use of n or greater moles of a carboxylic acid could result in every available hydroxyl group on the polyol being converted to a pendent ester group, which would leave no hydroxyl groups available for subsequent Williamson ether synthesis. It will be appreciated that although less than n moles of a carboxylic acid are used per mole of polyol having n hydroxyl groups, a relatively small percentage of the polyol molecules in the reaction will have all of their hydroxyl groups converted to pendent ester groups or may not have any of their hydroxyl groups converted to pendent ester groups, but the majority of the polyol molecules in the intermediate reaction batch will be partially-esterified, with at least one hydroxyl group still remaining. The intermediate reaction batch containing the partially-esterified compound(s) can then be subjected to Williamson synthesis to produce a final reaction batch comprising a large percentage of ether-ester compounds according to the invention.

In either method, a mixture of different ether-ester compounds is typically formed. Some ether-ester compounds in the mixture may contain two or more pendent ether groups and only one pendent ester group, whereas other ether-ester compounds in the mixture may contain two or more pendent ester groups and only one pendent ether group. Depending upon the number of hydroxyl groups initially present on the polyol and the relative amounts and composition of the alkyl halide(s), alkyl sulfate(s) and alkyl or aryl carboxylic acid(s) used in the reaction, a large number of different ether-ester compounds can be formed. The reaction batch will typically include a small percentage of molecules in which all of the hydroxyl groups originally on the polyol were converted to pendent ether groups or to pendent ester groups. If desired, the different ether-ester compounds can be isolated from each other and used individually as plasticizers in polymer resins. More preferably, the mixture of different ether-ester compounds is used as a plasticizer alone, or in combination with conventional plasticizers.

The term "polyol" as used in the instant specification and in the appended claims means any polyhydric alcohol containing three or more hydroxyl groups. The term thus includes linear, branched and substituted saturated organic compounds containing three or more hydroxyl groups. Virtually any polyol can be used as a starting material to prepare ether-ester compounds according to the invention. However, glycerol, pentaerythritol and dipentaerythritol are presently the most preferred polyols for use in preparing ether-ester compounds according to the invention. Sugar alcohols such as sorbitol and mannitol can also be used. Polyols having 3 to 12 chain carbon atoms are preferred.

As noted above, an alkoxide can be formed by contacting a polyol with an active metal such as sodium or other alkali metal in a solvent. Alternatively, an alkoxide can be formed by contacting the polyol with the dry hydroxide of an active metal (e.g., NaOH) and removing water or by contacting the polyol with an aqueous solution of active metal and driving off water. Suitable solvents are non reactive with the active metal and have a sufficiently high boiling point that heat can be applied to drive the reaction to the desired amount. In view of these needs, a preferred solvent for use in the invention is toluene. Toluene is also preferred for use in the invention because it forms an azeotrope with water, and thus water can be removed with less heat/energy.

Once formed, the alkoxide can be contacted with an alkyl halide or an alkyl sulfate to form a partially-etherized intermediate. Virtually any alkyl halide or alkyl sulfate can be used as a starting material to prepare ether-ester compounds according to the invention. Preferably, the alkyl halides and alkyl sulfates used in the invention contain up to about 11 carbon atoms, and more preferably from about 2 to about 9 carbon atoms, and may be branched or substituted. Benzyl chloride, chlorobutane, chloroisobutane, 1-chlorononane, 2-chlorononane, 5-chlorononane, chloroisononane and chlorotetradecane are presently preferred. Compatible mixtures of two or more alkyl halides and/or alkyl sulfates can also be used, if desired.

The partially-etherized intermediate, once formed, is converted into an ether-ester compound via Fischer esterification using a carboxylic acid. Again, virtually any carboxylic acid can be used in accordance with the invention. Alkyl and aryl carboxylic acids, which may but need not be halogenated, can be used. Preferably, the carboxylic acids used in the invention contain up to about 11 carbon atoms, and more preferably from about 2 to about 9 carbon atoms. Preferred alkyl carboxylic acids for preparing ether-ester compounds for use as plasticizers in polymer resins include, for example, acetic acid, bromoacetic acid, propanoic acid, 2-chloropropanoic acid, 3-chloropropanoic acid, butanoic acid, 2-methylpropanoic acid, 2-ethylpropanoic acid, pentanoic acid, 2-methylbutanoic acid, 3-methylbutanoic acid, 2-ethylbutanoic acid, 2,2-dimethylbutanoic acid, 2,3-dimethylbutanoic acid, 3,3-dimethylbutanoic acid, 2-methylpentanoic acid, 3-methylpentanoic acid, 4-methylpentanoic acid, hexanoic, cyclopentyl acetic acid, cyclopentyl propanoic acid, cyclopentyl hexanoic acid, cyclohexane carboxylic acid, cyclohexane acetic acid, 2-ethylhexanoic acid, nonadecafluorodecanoic acid, decanoic acid, and undecanoic acid. Preferred aryl carboxylic acids for preparing ether-ester compounds for use as plasticizers in polymer resins include, for example, benzoic acid, 2-methylbenzoic acid, 3-methylbenzoic acid, 4-methylbenzoic acid, 2-ethylbenzoic acid, 3-ethylbenzoic acid, 4-ethylbenzoic acid, 4-isopropylbenzoic acid, 4-tertiary butylbenzoic acid, 4-(1-methylpropyl)benzoic acid, 2-ethoxybenzoic acid, 3,4-dimethoxybenzoic acid, 4-methoxy-2-methylbenzoic acid, 4-acetylbenzoic acid, acetylmandelic acid, 2-chlorobenzoic acid, 3-chlorobenzoic acid, 4-chlorobenzoic acid, 2,3-dibromobenzoic acid, 2,4-di-iodobenzoic acid, 2,6-dibrombenzoic acid, 3,4-dibromobenzoic acid, 3,5-dichlorobenzoic acid, 2,3,5-tribromobenzoic acid, 2,4,6-trichlorobenzoic acid, 2,3,4,5,6-pentabromobenzoic acid, 1-naphthoic acid, 2-naphthoic acid, 4-biphenyl carboxylic acid, 2-biphenyl carboxylic acid, 4-biphenyl acetic acid, furfuryl carboxylic acid, and 3-pyridinecarboxylic acid.

As previously noted, the process steps can be completed in reverse order (i.e., whereby a polyol is partially-esterified and then one or more of the remaining hydroxyl groups are converted to ether groups). The same alkyl halides and/or alkyl sulfates and the same alkyl and/or aryl carboxylic acids are suitable when the process steps are reversed.

Gylcerol has three hydroxyl groups:

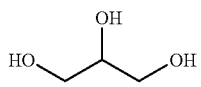

After being processed in accordance with one of the methods of the invention, a mixture comprising two or more of the following compounds may be formed from glycerol, where $R_1$ and $R_2$ are alkyl or aryl groups and are the same or different:

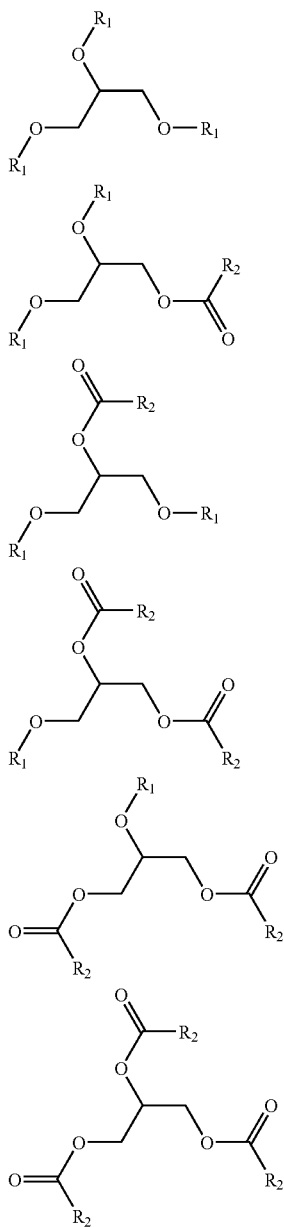

Two of the compounds shown above do not contain both a pendent ether group and a pendent ester group and thus should not be considered as compounds according to the invention. When mixtures of alkyl halides or alkyl sulfates are used, a greater number than four compounds according to the invention may be formed from glycerol.

Pentaerythritol has four hydroxyl groups:

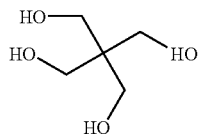

After being processed in accordance with one of the methods of the invention, a mixture comprising two or more of the following compounds may be formed from pentaerythritol, where $R_1$ and $R_2$ are alkyl or aryl groups and are the same or different:

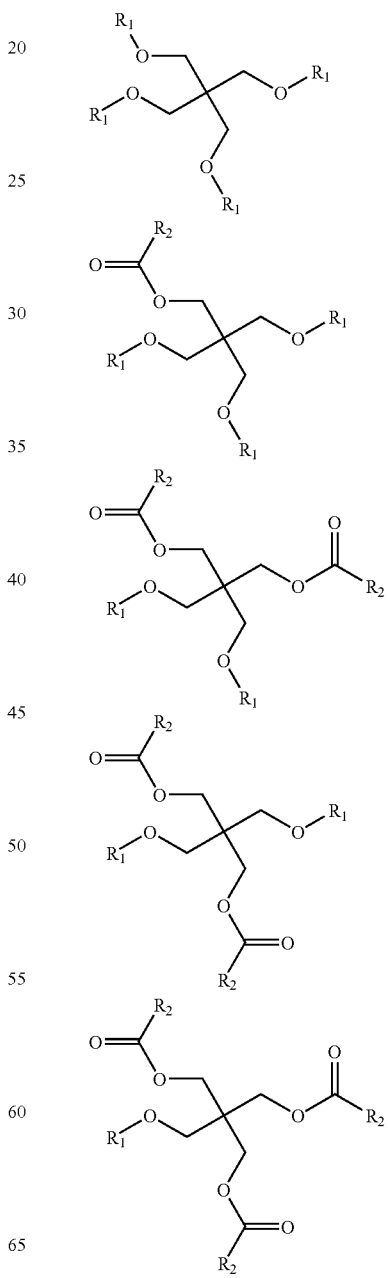

*-continued*

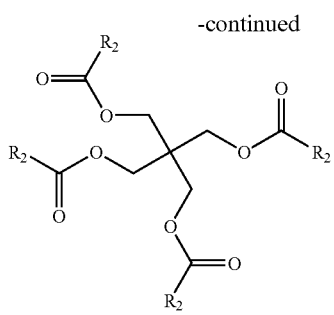

Two of the compounds shown above do not contain both a pendent ether group and a pendent ester group, and thus should not be considered as compounds according to the invention. When mixtures of alkyl halides or alkyl sulfates are used, a greater number than four compounds according to the invention may be formed from pentaerythritol.

It will be appreciated that the number of potential compounds formed will be determined by the number of hydroxyl groups in the starting polyol, the number of different alkyl halide and/or alkyl sulfates and the number of different alkyl and/or aryl carboxylic acids used in the reactions.

Ether-ester compounds according to the present invention can be used as plasticizers in a wide variety of polymer resins. For example, the ether-ester compounds according to the invention can be used in vinyl polymers such as, for example, PVC, polyvinyl acetate, and polyvinyl butryal. They can also be used in rubbers such as, for example, nitrile and styrene-butadiene rubber (SBR), polyurethanes, and in thermoplastics such as acrylics. Other applications include polysulfides and cellulose.

The following examples are intended only to illustrate the invention and should not be construed as imposing limitations upon the claims.

EXAMPLE 1

Two moles of sodium metal and one mole of glycerol were added to a stirred reactor vessel containing toluene as a solvent. The temperature of the reactor vessel was maintained above 105° C. to remove the water by-product and to form a mixture of alkoxides. The mixture of alkoxides was then reacted with two moles of a benzyl chloride to give a mixture of four ether intermediate compounds, namely: 2,3-(dibenzyloxy)propanol; 1,3-(dibenzyloxy)propanol; 3-benzyloxy-1,2-propanediol; and 2-benzyloxy-1,3-propanediol. The by-product sodium chloride was removed by water washing.

One mole of benzoic acid and a catalytic amount of a Lewis acid were added to the mixture of four ether intermediate compounds and heated to a temperature greater than 180° C. for 3.5 hours. Water was removed from the reaction as it formed. A mixture comprising four ether-ester compounds according to the invention was formed, namely: 3-benzyloxy-1,2-propyl dibenzoate; 2-benzyloxy-1,3-propyl dibenzoate; 2,3-(dibenzyloxy)propyl benzoate; and 1,3-(dibenzyloxy) propyl benzoate.

The reaction was repeated three times. Each time, four ether-ester compounds were formed. On average, the mixture of ether-ester compounds comprised: from about 2.5% to about 5% by weight of 3-benzyloxy-1,2-propyl dibenzoate; from about 2.5% to about 5% by weight of 2-benzyloxy-1,3-propyl dibenzoate; from about 35% to about 42.5% by weight of 2,3-(dibenzyloxy)propyl benzoate; from about 35% to about 42.5% by weight of 1,3-(dibenzyloxy)propyl benzoate; and from about 5% to about 15% by weight of 1,2,3-tribenzyloxypropane, which is not an ether-ester according to the invention.

EXAMPLE 2

20 grams of the mixture of ether-ester compounds formed in Example 1 was mixed with 0.069 grams barium stearate, 0.021 grams zinc stearate, 0.006 grams bis-phenol A, 0.015 grams 1,3-diphenylpropane-1,3-dione, 0.039 grams magnesium aluminum hydroxycarbonate and 30 grams of OXYVINYLS 255F resin (a polyvinyl chloride homopolymer available from OxyVinyls, LP of Dallas, Tex.). The materials were milled and then molded to form sheets for plasticizer compatibility testing in accordance with the procedures set forth in the ASTM D-3291-97 standard, plasticizer water sensitivity and kerosene sensitivity testing in accordance with the procedures set forth in ASTM D-1239-98, plasticizer volatile loss testing in accordance with ASTM D-1203-94, and plasticizer Shore hardness testing in accordance with ASTM D-2240-2004.

For comparative purposes, 20 grams of di-isononyl phthalate was mixed with 0.069 grams barium stearate, 0.021 grams zinc stereate, 0.006 grams bis-phenol A, 0.015 grams 1,3-diphenylpropane-1,3-dione, 0.039 grams Magnesium aluminum hydroxycarbonate and 30 grams of OXYVINYL 255F resin. The materials were milled and molded to form sheets for the same plasticizer testing previously listed. The results of the tests are reported in Table 1 below:

TABLE 1

| Plasticizer | ASTM D3291 1 week | ASTM D1239 water 50° C., 1 day (wt % of plasticizer lost) | ASTM D1239 Kerosene 23° C., 1 day (wt % of plasticizer lost) | ASTM D1203 1 day @ 87° C. Volatility (wt % of plasticizer lost) | ASTM D2249 Shore Hardness |
|---|---|---|---|---|---|
| Mixture of Ether-Ester Compounds from Example 1 | 0 | 0.49 | 1.8 | 2.7 | 76 |
| Di-isononyl phthalate | 0 | 0.31 | 65 | 1.6 | 76 |

The results in Table 1 above indicate that the mixture of ether-ester compounds formed in Example 1 is as compatible (ASTM D3291) and as effective (ASTM D2249) as DINP in PVC, and that it exhibits volatility and water sensitivity similar to DINP in PVC, but that it out performs DINP in resistance to kerosene.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A composition suitable for use as a plasticizer for polymer resins comprising a mixture comprising:
   a first ether-ester compound formed from gylcerol, pentaerythritol or dipentaerythritol having at least two pendent ether groups and at least one pendent ester group, and
   a second ether-ester compound formed from gylcerol, pentaerythritol or dipentaerythritol having at least one pendent ether group and at least two pendent ester groups, wherein the first ether-ester compound and the second ether-ester compound are different.

2. The composition according to claim 1 comprising 2,3-(dibenzyloxy)propyl benzoate.

3. The composition according to claim 1 comprising 1,3-(dibenzyloxy)propyl benzoate.

4. The composition according to claim 1 comprising:
   from about 2.5% to about 5% by weight of 3-benzyloxy-1,2-propyl dibenzoate;
   from about 2.5% to abut 5% by weight of 2-benzyloxy-1,3-propyl dibenzoate;
   from about 35% to about 42.5% by weight of 2,3-(dibenzyloxy)propyl benzoate;
   from about 35% to about 42.5% by weight of 1,3-(dibenzyloxy)propyl benzoate; and
   from about 5% to about 15% by weight of 1,2,3-tribenzyloxypropane.

5. A method of plasticizing a polymer resin comprising:
   providing a polymer resin;
   providing a composition according to claim 1; and
   dispersing the composition through the polymer resin.

6. The method according to claim 5 wherein the polymer resin is selected from the group consisting of vinyl polymers, rubbers, polyurethanes, and acrylics.

7. A plasticized polymer composition comprising a polymer resin having a composition according to claim 1 dispersed therein.

8. The plasticized polymer composition according to claim 7 wherein the polymer resin is selected from the group consisting of vinyl polymers, rubbers, polyurethanes, and acrylics.

9. The plasticized polymer composition according to claim 7 wherein the plasticizer is present in an amount from about 5% to about 70% by weight.

* * * * *